United States Patent [19]

Wang

[11] Patent Number: 5,530,796

[45] Date of Patent: Jun. 25, 1996

[54] MENU BAR EDITOR

[75] Inventor: John S. Wang, Travis County, Tex.

[73] Assignee: International Business Machines Corporation, Armonk, N.Y.

[21] Appl. No.: 315,365

[22] Filed: Sep. 30, 1994

[51] Int. Cl.⁶ .................................................. G06F 15/00
[52] U.S. Cl. .................... 395/156; 395/155; 395/157; 395/159; 395/160
[58] Field of Search ................................. 395/155, 156, 395/157, 158, 159, 160

[56] References Cited

U.S. PATENT DOCUMENTS

| | | | |
|---|---|---|---|
| 4,664,616 | 5/1987 | Himelstein | 345/121 |
| 4,686,522 | 8/1987 | Hernandez et al. | 345/100 |
| 4,772,882 | 9/1988 | Mical | 345/146 |
| 4,873,623 | 10/1989 | Lane et al. | 364/188 |
| 5,119,475 | 6/1992 | Smith et al. | 395/156 |
| 5,119,476 | 6/1992 | Texier | 295/157 |
| 5,201,050 | 4/1993 | McKeeman et al. | 395/700 |
| 5,206,950 | 4/1993 | Geary et al. | 395/600 |
| 5,208,907 | 5/1993 | Shelton et al. | 395/149 |
| 5,208,910 | 5/1993 | Higgins et al. | 395/156 |
| 5,220,675 | 6/1993 | Padawer et al. | 395/800 |
| 5,228,123 | 7/1993 | Heckel | 395/155 |
| 5,287,447 | 2/1994 | Miller et al. | 395/157 |
| 5,287,514 | 2/1994 | Grain | 395/700 |
| 5,297,250 | 3/1994 | Leroy et al. | 395/157 |
| 5,303,379 | 4/1994 | Khoyi et al. | 395/700 |
| 5,398,312 | 3/1995 | Hoffmann | 395/156 |

OTHER PUBLICATIONS

IBM Corp. "Method to Provide Customization of an User Interface by an End User", IBM Technical Disclosure Bulletin, vol. 31, Jun. 1988, pp. 337–338.

*Primary Examiner*—Mark R. Powell
*Assistant Examiner*—B. Huynh
*Attorney, Agent, or Firm*—Whitham, Curtis, Whitham & McGinn; Jeffrey LaBaw

[57] ABSTRACT

A direct screen manipulation technique allows for the design a menu bar, pull down menus and cascaded menus in computer application programs. The technique is implemented using a graphic user interface (GUI) employing a windowing display. The user may select a menu bar tool object from a toolbox window on the display screen and "drag-and-drop" the menu bar tool object on an application window on the same display screen. This forms a blank menu bar below the title bar of the application window. By selecting the menu bar, a text cursor is shown at the default initial position. The first menu bar item is defined by entering text, typically using the keyboard, and when the menu bar item has been defined, the Control-Right Tab key is pressed. This moves the text cursor to the next menu item position, and the next and subsequent menu bar items are defined in the same way. Once a menu bar item has been defined, it may be selected using the pointing cursor followed by pressing the Enter key, which causes a pull down menu to be displayed. The pull down menu is displayed with the text cursor at the first default item position, and pull down menu items are defined in a manner similar to that for the menu bar. By selecting a pull down menu item which has been defined followed by pressing the Enter key, a cascade menu is displayed with the text cursor at the first default item position. Again, cascade menu items are defined in a manner similar to that used for the menu bar and the pull down menu. The process continues until all menu bar items, pull down menu items and cascade menu items have been defined.

10 Claims, 15 Drawing Sheets

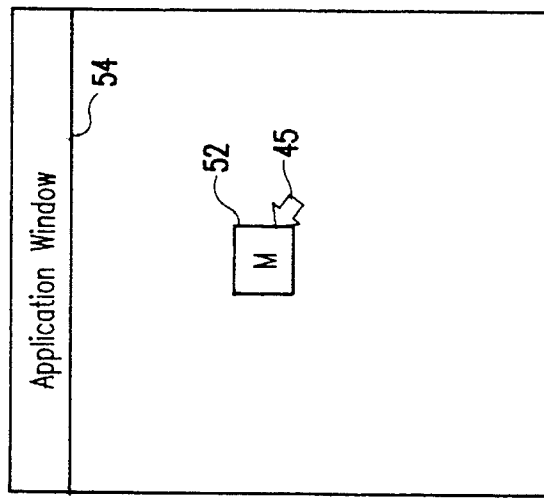
FIG.5
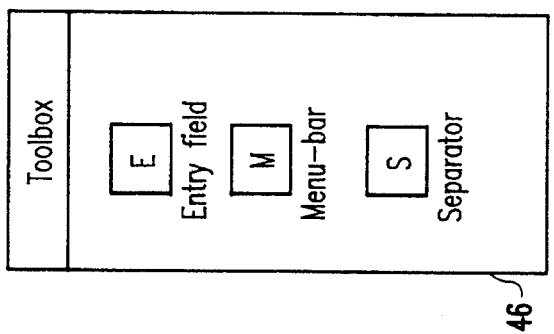
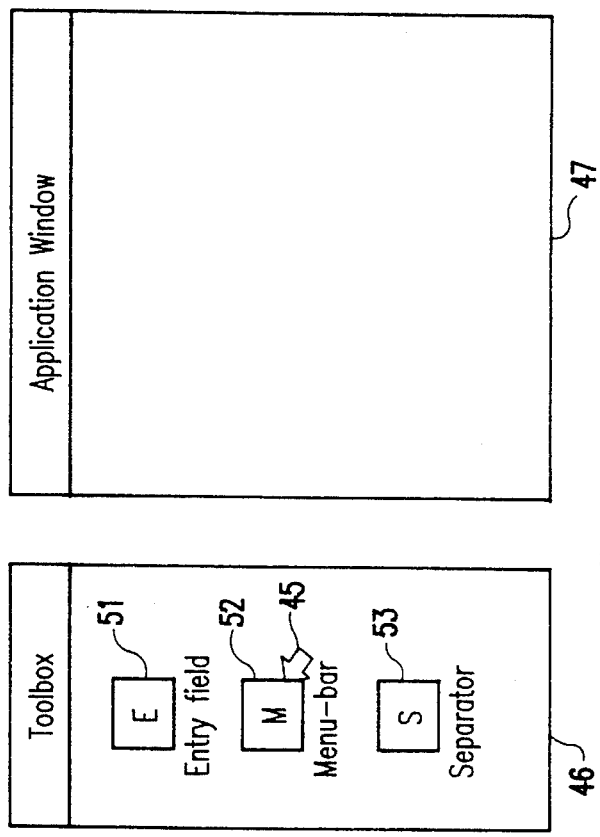
FIG.4

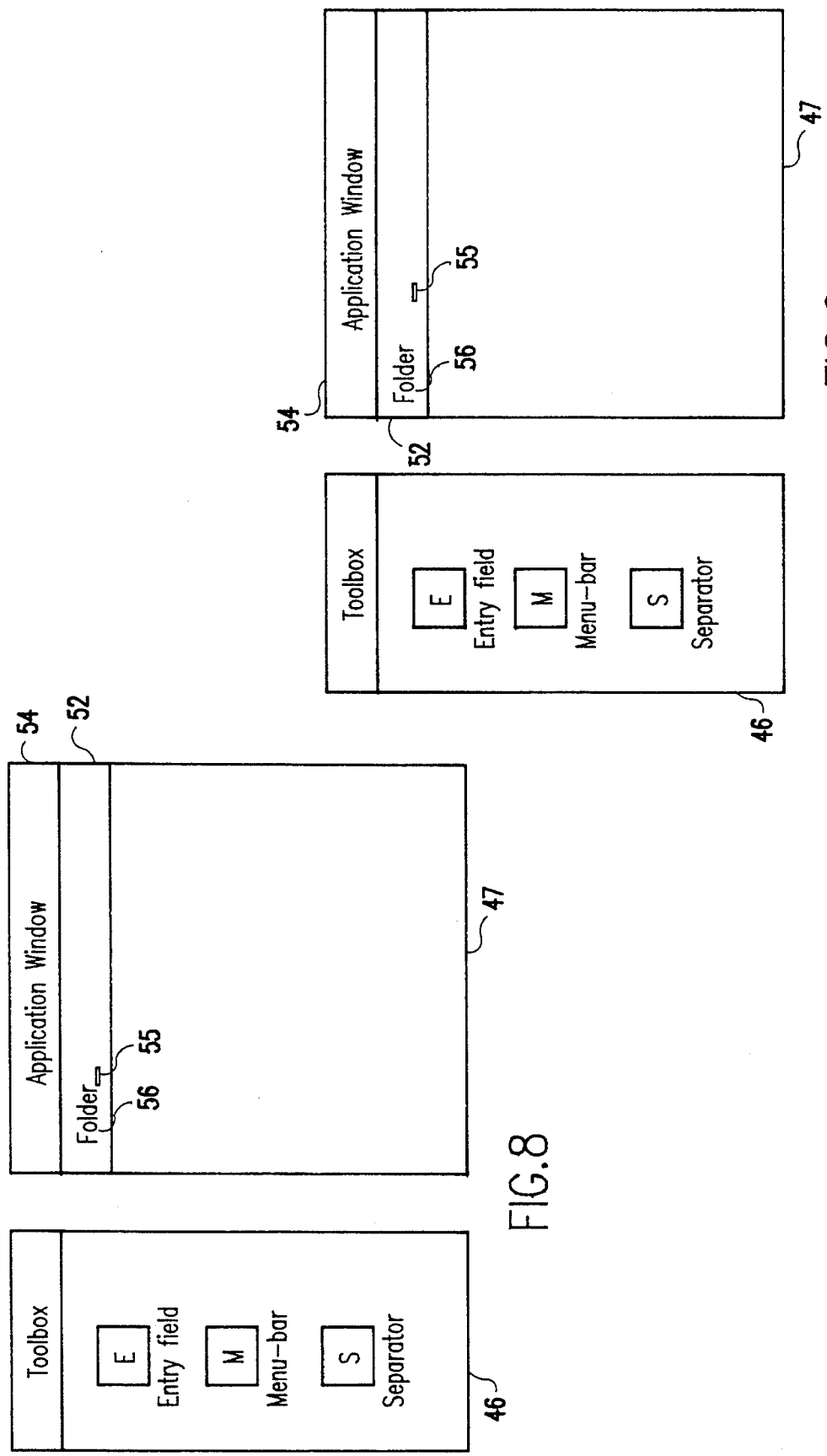

MENU BAR EDITOR

BACKGROUND OF THE INVENTION

1. Field of the Invention

The present invention generally relates to computer user interfaces presented on a display screen and, more particularly, to a user friendly technique for the direct screen design of a menu bar, including pop down menus and cascaded menus.

2. Description of the Prior Art

In many computer application programs, a menu bar is displayed at the top of the screen. This is an important user interface to the application, allowing the user to access commands or information by the use of a pointing cursor controlled by a mouse, trackball or other pointing device. By selecting a menu bar item, a pull down menu is displayed having a plurality of commands or options. Selecting a displayed command in the pull down menu invokes that command. Selecting a displayed option causes a cascade menu to be displayed adjacent the pull down menu. The cascade menu provides the user with various choices from which a selection may be made. While there may be further levels of cascaded menus, typically there is but one level for most applications.

In the design of the user interface for the application program, the programmer must define the menu bar along with the pull down menus and cascade menus. This can be accomplished through the menu bar object property window, but this can be a tedious task. Another approach is to define a menu bar through a property window, but this can be a tedious task since it is an indirect manipulation that is difficult to use.

SUMMARY OF THE INVENTION

It is therefore an object of the present invention to provide a direct screen manipulation technique for the design a menu bar, pull down menus and cascaded menus.

It is another object of the invention to provide a user friendly technique for the design and definition of application program menu bars and related pull down and cascaded menus.

It is a further object of the invention to provide a technique for direct editing of the menu bar object directly inside the object.

According to the invention, there is provided a menu bar editor having a consistent user interface to move, resize, and edit any object on the display screen. The technique according to the invention is implemented using a graphic user interface (GUI) employing a windowing display, sometimes referred to as a "desktop". Such an interface typically has a plurality of objects, in the form of icons, which may be selected by the user. In the practice of this invention, the user may select a menu bar tool object from a toolbox window on the display screen and "drag-and-drop" the menu bar tool object on an application window on the same display screen. This forms a blank menu bar below the title bar of the application window. By selecting the menu bar, a text cursor is shown at the default initial position. The first menu bar item is defined by entering text, typically using the keyboard, and when the menu bar item has been defined, the Enter key is pressed. This moves the text cursor to the next menu item position, and the next and subsequent menu bar items are defined in the same way. Once a menu bar item has been defined, it may be selected using the pointing cursor followed by pressing the Enter key, which causes a pull down menu to be displayed. The pull down menu is displayed with the text cursor at the first default item position, and pull down menu items are defined in a manner similar to that for the menu bar. By selecting a pull down menu item which has been defined, a cascade menu is displayed with the text cursor at the first default item position. Again, cascade menu items are defined in a manner similar to that used for the menu bar and the pull down menu. The process continues until all menu bar items, pull down menu items and cascade menu items have been defined.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a facsimile of the screen shown in FIG. 3 after the application builder icon is opened to display a toolbox window and a application window on a computer screen;

FIG. 5 is a facsimile of the screen shown in FIG. 4 with a menu bar tool object moved from the tool box to the application window;

FIG. 8 is a facsimile of the screen shown in FIG. 7 showing the text for a first menu item to be defined in the menu bar;

FIG. 9 is a facsimile of the screen shown in FIG. 8 after the first menu item has been defined by pressing the Enter key showing the text cursor at the next menu item position;

DETAILED DESCRIPTION OF A PREFERRED EMBODIMENT OF THE INVENTION

Figure 1:
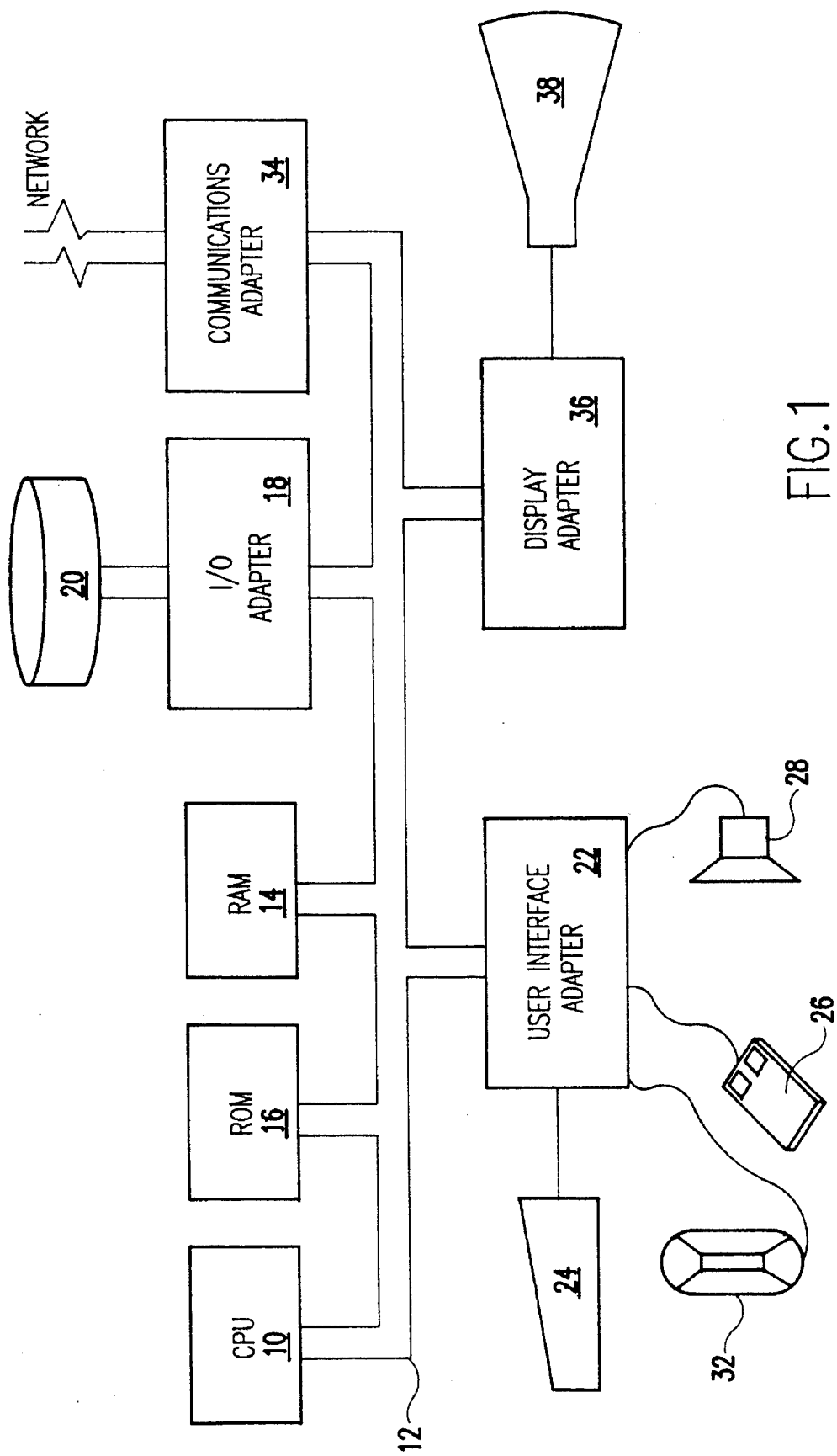
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a personal computer such as the International Business Machines (IBM) Corporation's PS/2 Personal Computers or a workstation such as IBM's RS/6000 Workstations. The hardware includes a central processing unit (CPU) 10, which may be a complex instruction set computer (CISC) microprocessor such as the Intel 386, 486 or Pentium microprocessors, generally referred to as X86 microprocessors, or a reduced instruction set computer microprocessor such as IBM's PowerPC microprocessor. The CPU 10 is attached to a system bus 12 to which are attached a random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The I/O adapter 18 may support, for example, the Integrated Device Electronics (IDE) interface standard or the SCSI interface standard. In the former case, the I/O adapter 18 typically will support two disk drives in parallel, designated as drives "C:" and "D:" In the latter case, the I/O adapter 18 will support up to nine disk drives or other SCSI I/O devices connected in a daisy chain. The user interface adapter 22 has attached to it a keyboard 24, a mouse 26, a speaker 28, a microphone 32, and/or other user interface devices such as a touch screen device (not shown). Such touch screen device would optionally be installed on the display 38, here represented as a cathode ray tube (CRT) display but which may be a liquid crystal display (LCD). The display 38 is connected to the system bus 12 via a display adapter 34. Optionally, a communications adapter 34 is connected to the bus 12 and to a network, such as a local area network (LAN), such as IBM's Token Ring LAN. Alternatively, the communications adapter may be a modem connecting the personal computer or workstation to a telephone line as part of a wide area network (WAN).

Figure 2:
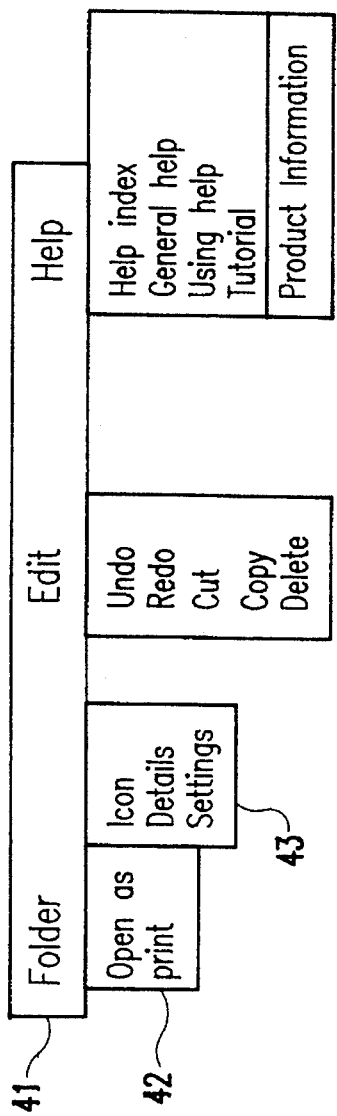
FIG. 2 is a facsimile of a menu bar with pull down menus and cascades as displayed on a computer screen.

The screen of display 38 typically provides a user interface to inputting commands or accessing help text in the form of a menu bar as illustrated in FIG. 2. The menu bar 41 is accessed by means of a pointing cursor controlled by a mouse. By placing the pointing cursor on one of the objects in the menu bar and pressing the left mouse button, that object is selected. This action causes a pull down menu, such as pull down menu 42, to be displayed. Similarly, selecting an object on the pull down menu may cause a cascade menu, such as cascade menu 43, to be displayed. Not all objects on a pull down menu have corresponding cascade menus. It will be understood that only one pull down menu will be displayed at a time since only one object on the menu bar can be selected at a time.

Figure 3:
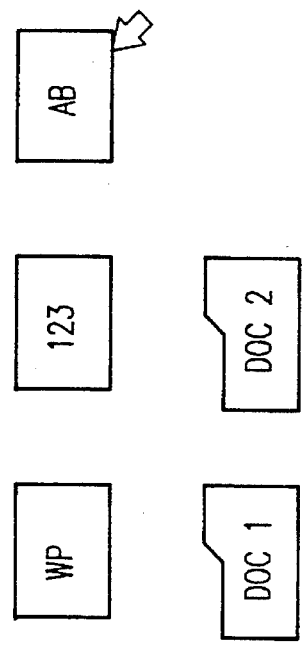
FIG. 3 is an illustration of a desktop which includes an Application Builder icon.

To define a menu bar for the user interface, a user opens an Application Builder (AB) application. In a graphic user interface (GUI), there are typically a number of icons which represent applications. The area of the display screen where these icons are displayed is sometimes referred to as the "desktop". To open an application program, the icon for that application is selected using the pointing cursor and mouse. More particularly, the pointing cursor is placed on the icon and the left mouse button is double clicked. The icon 44 for the Application Builder (AB) is shown generically in FIG. 3 with the pointing cursor 45 touching it. When the AB icon 44 on the desktop is selected, a Toolbox window 46 and Application window 47 are opened on the display screen, as shown in FIG. 4. In FIG. 4, only three tools, entry field object 51, menu bar object 52 and a separator object 53, are shown in the tool box 46.

Figure 7:
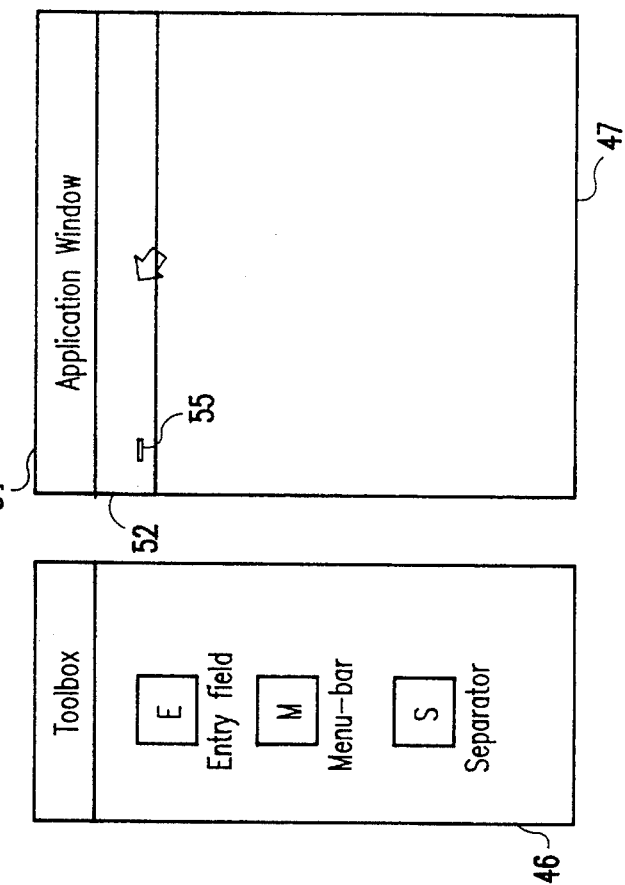
FIG. 7 is a facsimile of the screen shown in FIG. 6 after the menu bar has been selected showing a text cursor shown at the first character position of the first menu item.
Figure 6:
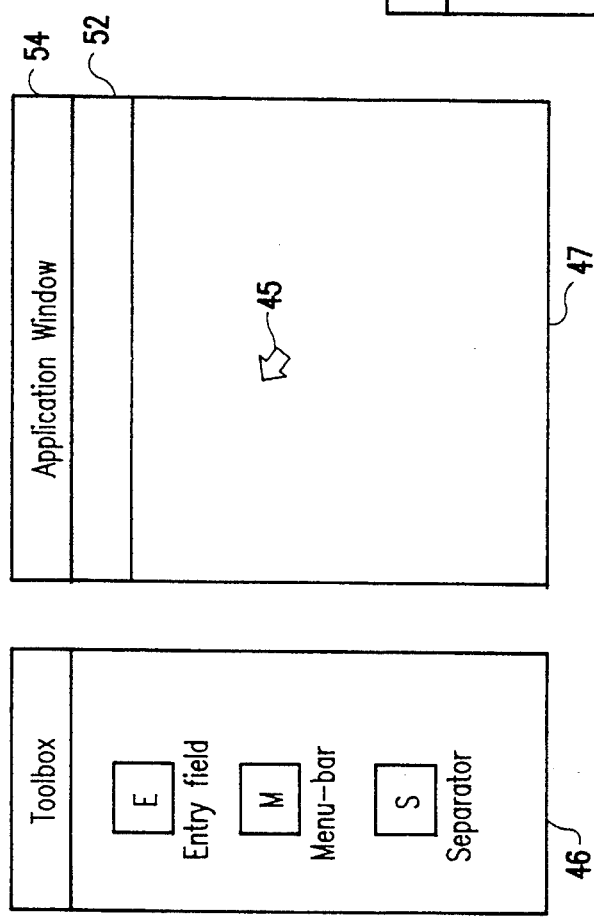
FIG. 6 is a facsimile of the screen shown in FIG. 5 showing a blank menu bar at the top of the application window.
Figure 10:
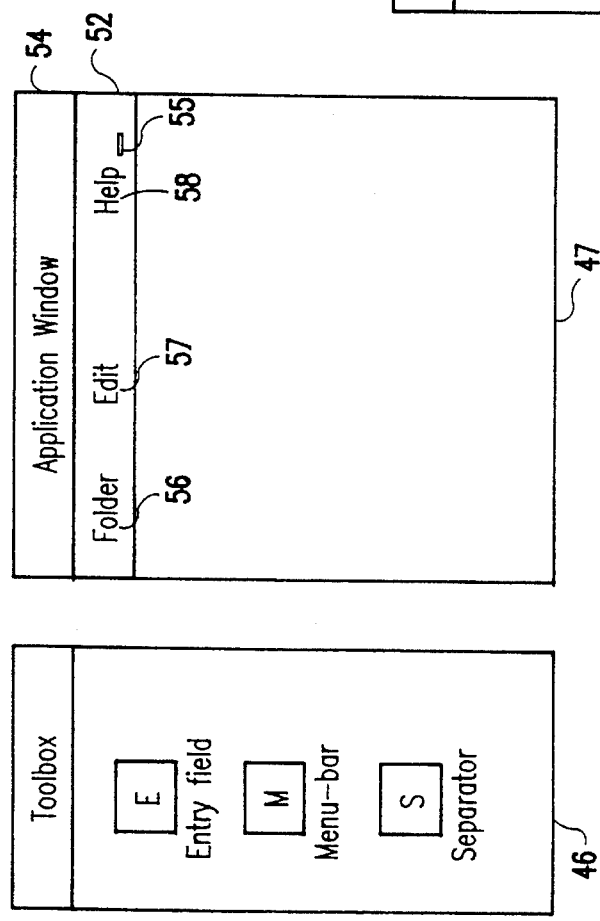
FIG. 10 is a facsimile of the screen shown in FIG. 9 after the text for a second and a third menu items have been defined.

The menu bar object 52 may be dragged and dropped from the tool box window 46 into the application window 47, using the cursor, as shown in FIG. 5. More specifically, the pointing cursor is placed on the object, the left button of the mouse is held down, the object is "dragged" across the screen by moving the cursor with the mouse, and the object is "dropped" when in the desired location by releasing the mouse button. FIG. 6 shows that the menu bar object 52 is placed on top of the application window 47, below the title bar 54. Since this is a menu bar object, when dropped on the application window 47, the menu bar object extends across the top of the screen, but it is initially blank. The user may then select the menu bar object 52, using the pointing cursor. This action results in a text cursor 55 being displayed at the first character position from the default left margin of the menu bar object, as shown in FIG. 7. The user may use the keyboard to enter the first menu item which, in the example illustrated, is "Folder" 56, as shown in FIG. 8. After the menu item "Folder" 56 is defined, the user may enter Control-Right-Tab which move the text cursor 55 to the left margin of the next menu item position, as shown in FIG. 9. The user can then use the keyboard to enter the second menu item which, in this example, is "Edit" 57, and finally, using the same procedure, the user enters the third item which, in this example, is "Help" 58, as shown in FIG. 10. The user may then use Left-Arrow, Right-Arrow to move the cursor within the menu item and Left-Tab, Right-Tab to move the cursor between the top level menu items.

Figure 11:
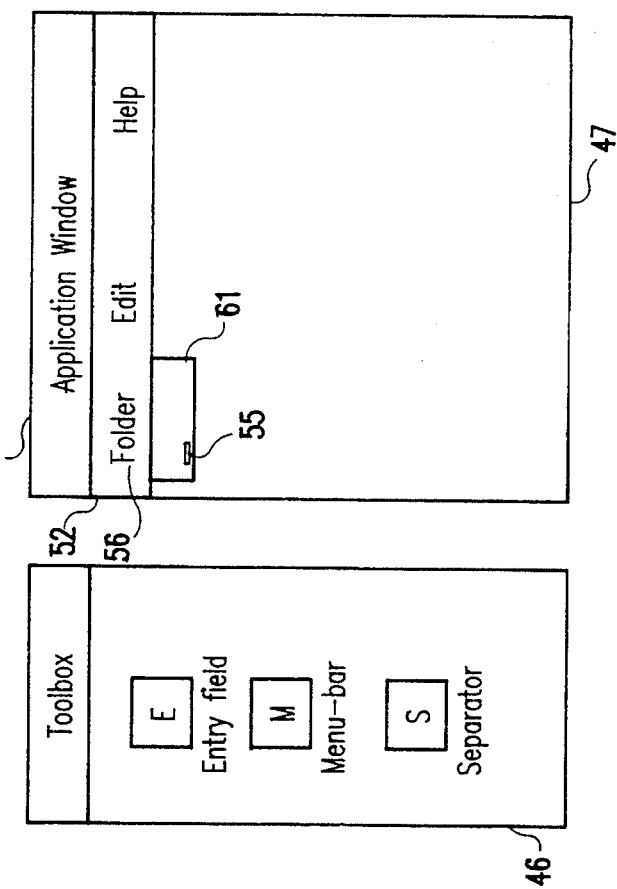
FIG. 11 is a facsimile of the screen shown in FIG. 10 showing the display of a pull down menu after an item defined in the menu bar has been selected.

The user may define the pull down menu 61 for the menu item "Folder" 56 by selecting that item and pressing the Enter key. The pull down menu 61 is then created with one entry field, and the text cursor 55 is then moved to the default left margin of the first pull-down menu, as shown in FIG. 11.

Figure 13:
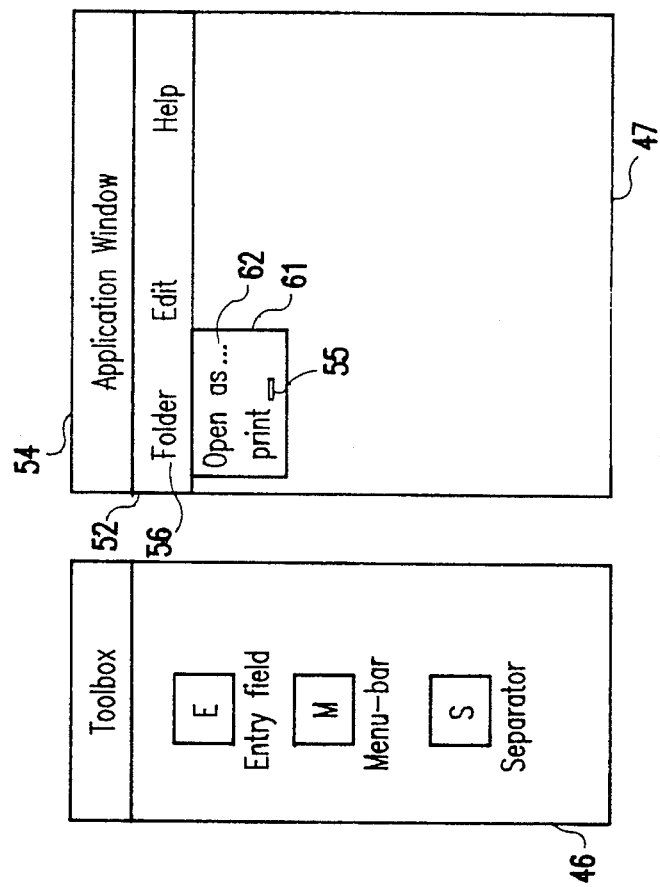
FIG. 13 is a facsimile of the screen shown in FIG. 12 showing the text for a second menu item for the pull down menu.
Figure 12:
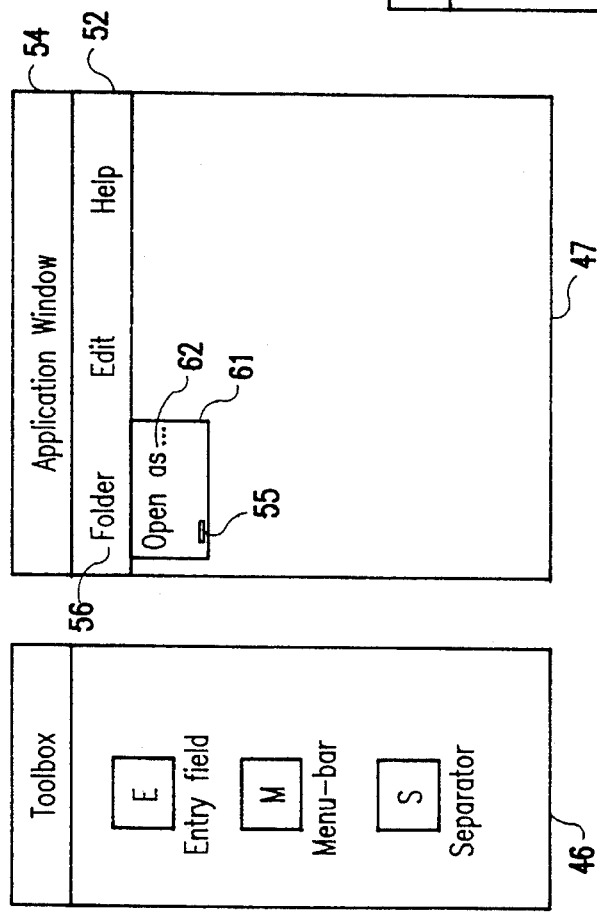
FIG. 12 is a facsimile of the screen shown in FIG. 11 after a first pull down menu item has been defined.
Figure 15:
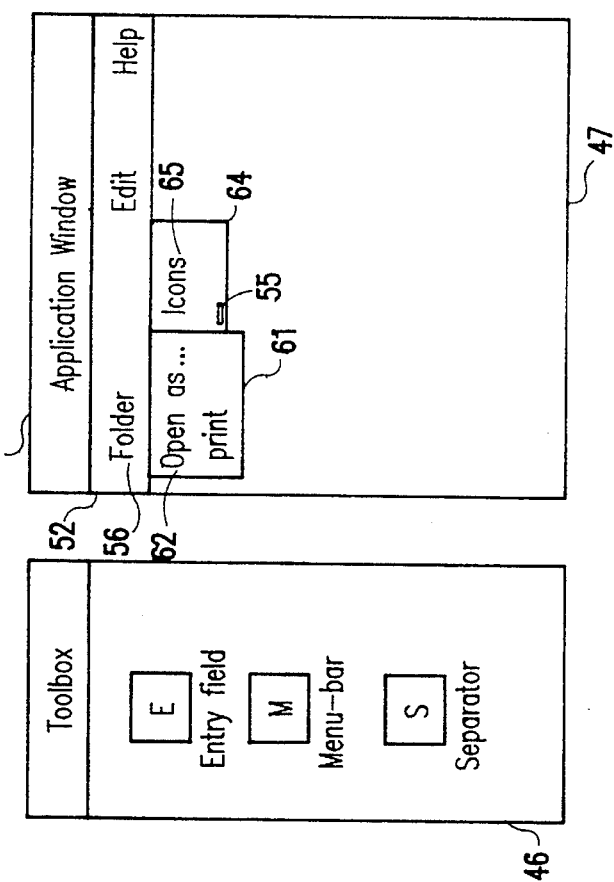
FIG. 15 is a facsimile of the screen shown in FIG. 14 after a first menu item has been defined in the cascade menu.
Figure 14:
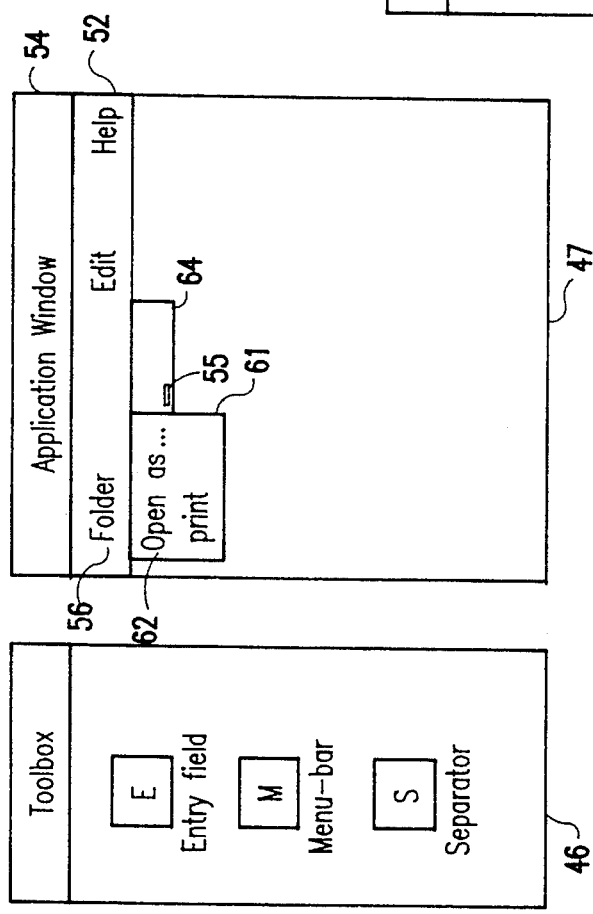
FIG. 14 is a facsimile of the screen shown in FIG. 13 showing the display of a cascade menu caused by selecting a menu item defined in the pull down menu.

The user may then enter the pull down menu item "Open as . . ." 62, using the keyboard, as shown in FIG. 12. After entering menu item "Open as . . ." 62, pressing the Enter key will move the text cursor 55 to the left default margin for the next pull-down menu item. The user, in this example, then enters "Print" 63 as the next pull down menu item, as shown in FIG. 13. The pull down menu 61 may be navigated using Left-Arrow, Right-Arrow, Up-Arrow, and Down-Arrow. From any pull down menu item, the user may use Control-Right-Tab to create new Cascaded menu for that pull down menu item. A Cascaded menu 64 created for the menu item "Open as . . ." 62 is shown in FIG. 14. The first entry by the user, in this example, is menu item "Icons" 65. Pressing the Enter key moves the text cursor 55 to the default left margin for the second menu item as shown in FIG. 14.

Figure 16:
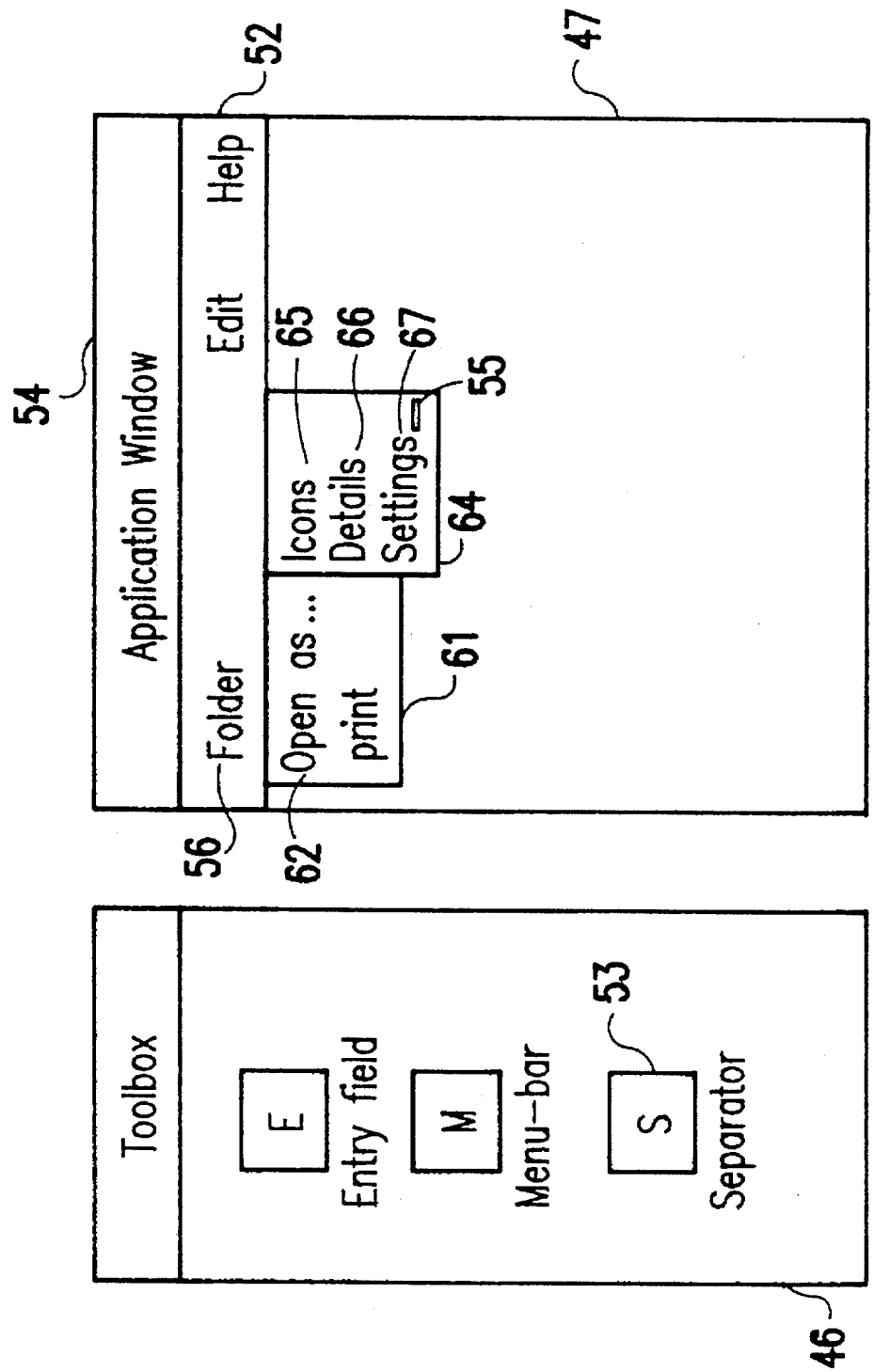
FIG. 16 is a facsimile of the screen shown in FIG. 15 showing the cascade menu with three menu items defined.

The same keys applied for the pull down menu 61 also work for the cascaded menu 64. FIG. 16 shows three cascaded menu items, "Icons" 65, "Details" 66 and "Settings" 67, have been defined by the user. The Separator tool object 53 can be dragged and dropped from the toolbox 46 into the pull down menu 61 or cascaded menu 64. It can be selected, moved, copied, and deleted.

The detail creation/deletion key definitions are shown in Table 1 below.

TABLE 1

| Creation/Deletion Command | |
|---|---|
| A–Z, a–z, 0–9, Space, period | Inserts the character before the cursor. |
| Back Space | Deletes the character before the cursor, if any. |
| Enter | If the current menu item is top-level, create a new first child and go on to it. Otherwise create a new menu item immediately below and go on to it. |
| Control-Right-Tab | If the menu item is top level, create a new top-level item immediately to the right and go to it. Otherwise, create a new first child and go to it. |
| Control-Left-Tab | Deletes current item at the cursor position |

The detail navigation key definitions are shown in Table 2 below:

TABLE 2

| Navigation command | |
|---|---|
| Left-Arrow, Right-Arrow | Move cursor within the menu item. |
| Right-Tab | If the current menu Item is top-level, go to menu item on the right, if any. If the current menu item is not top-level and a parent, go to its first child. |
| Left-Tab | If the current menu item is top-level, go to menu item on left, it any. Otherwise, go to parent of the current menu item. |
| Up-Arrow | If the current menu item is not top-level, go to menu item above or to parent if already at first item. |
| Down-Arrow | If the current menu item is top-level, go to child, if any. Otherwise, go to the menu item below, if any. |

Having described the functional operation of my invention, the logic of the processes employed will now be described. After the menu bar has been dragged and dropped inside the application window, the top level menu bar object is created under the window title with a width equal to the width of the application window and a default height according to the current font size used in the application window. After the user selects the menu bar, a text cursor appears at the default left margin position. The first child of the top level menu bar is created. In the object oriented design approach used, every action is event driven; that is, when an event occurs on an object such as a mouse event or a keyboard event, an action will be taken. The action taken is a program procedure which is called to achieve that action.

The creation/deletion commands and navigation commands set out in Tables 1 and 2 are represented as individual method calls. All the character input, back space deletion, left arrow/right arrow navigation is handled by simple text objects.

The left mouse button selection is used to create the first menu bar item object. The following method handles the left mouse button selection event:

```
Method Left Mouse Button Selection
    If (current object is top level menu bar)
        Then
            Create a new child under the current object
            Set selected object = new child
    Endif
    Move the cursor to the default left margin of
        the selected object
Endmethod
```

Figure 17:
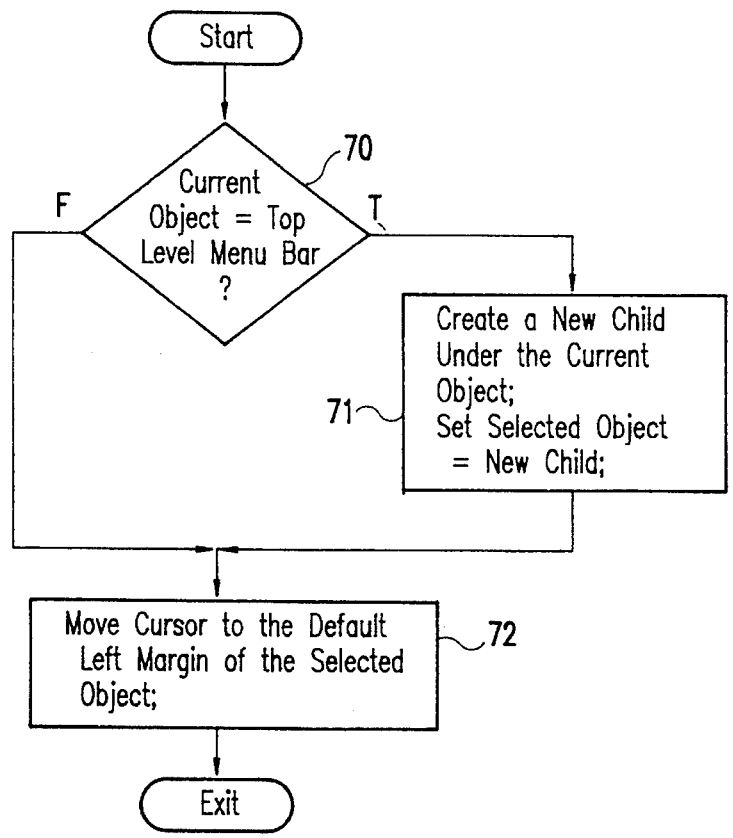
FIG. 17 is a flow diagram showing the logic of the left mouse button selection.

The process is shown in FIG. 17 which begins in decision block 70 by first testing to determine if the current object is a top level menu bar. If so, a new child is created in function block 71. The new child is created under the current object and the selected object is set to the new child. After that or if the current object was not a top level menu bar in decision block 70, the cursor is moved to the default left margin of the selected object in function block 72 before the method exits.

The Enter key is used to create the object "below" the current object. Only a pull down menu item can be crated below the menu bar item, only a pull down menu item can be created from a pull down menu item, and only a cascade menu item can be created under another cascade menu item in response to an Enter key event. The following method handles an Enter key event:

```
Method Enter
    If (current object is menu bar item)
        Then
            Create a new child under current object
        Else
            Create a new sibling under current object
    Endif
    Move cursor to default left margin of new object
Endmethod
```

Figure 18:
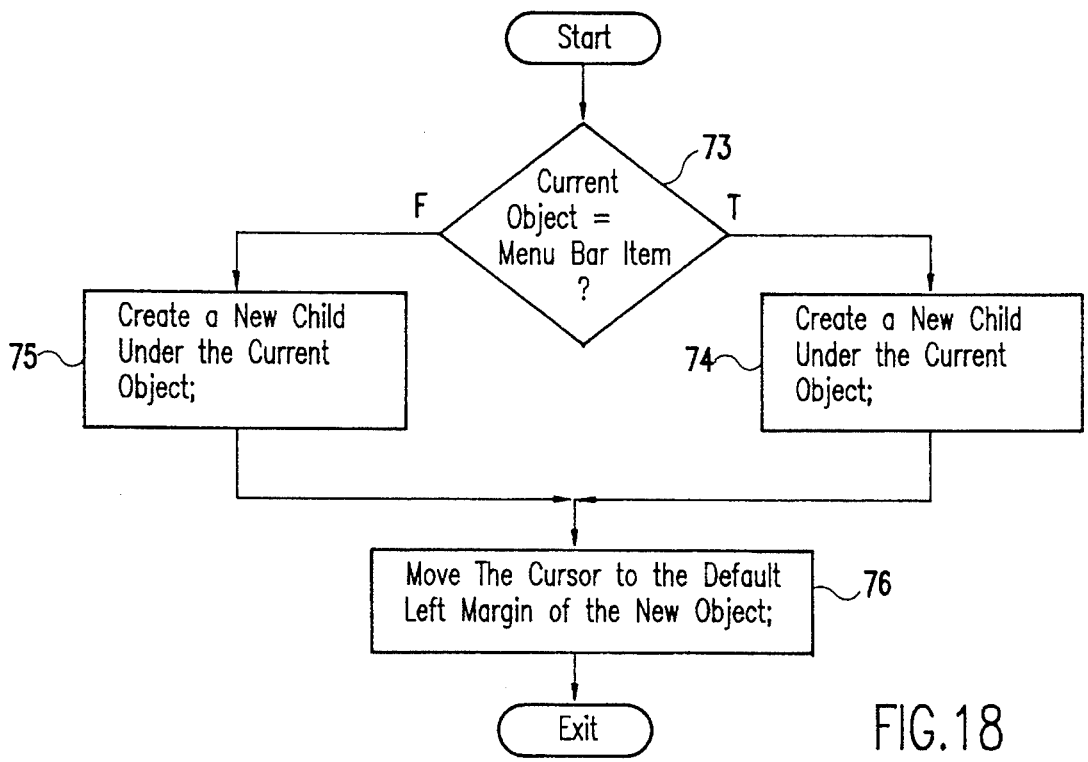
FIG. 18 is a flow diagram showing the logic of the response to pressing the Enter key.

The process is shown in FIG. 18 which begins by determining in decision block 73 whether the current object is a menu bar item. If so, a new child is created under the current object in function block 74; otherwise, a new sibling is created under the current object in function block 75. In either case, after the new child or new sibling has been created, the cursor is moved to the default left margin of the new object in function block 76 before the process exits.

The Control-Right Tab is used to create the object "on the right" of the current object. Only a menu bar item can be created on the right of the menu bar item, only a cascade menu item can be created on the right of a pull down menu item, and only a cascade menu item can be created on the right of another cascade menu item. The following method handles a Control-Right Tab event:

```
Method Control-Right-Tab
    If (current object is a menu bar item)
        Then
            Create new sibling on right of current object
        Else
            Create new child on right of current object
```

```
    Endif
    Move cursor to default left margin of new object
Endmethod
```

Figure 19:
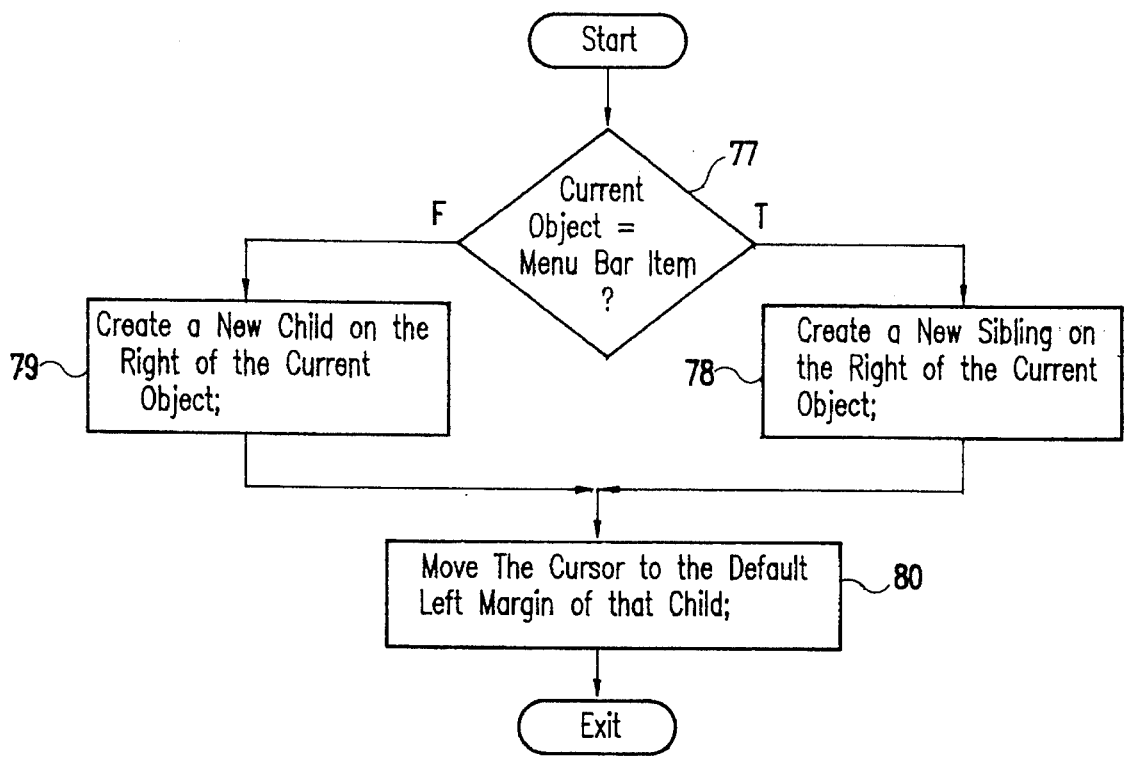
FIG. 19 is a flow diagram showing the logic of the Control/Right Tab control function.

The process is shown in FIG. 19 which begins by determining in decision block 77 whether the current object is a menu bar item. If so, a new sibling is created to the right of the current object in function block 78; otherwise, a new child is created to the right of the current object in function block 79. In either case, after the new child or new sibling has been created, the cursor is moved to the default left margin of the new object in function block 80 before the process exits.

The Control-Left Tab is used to delete the current object. The following method handles the Control-Left Tab event:

```
Method Control-Left-Tab
    If (current object is the child of the parent)
        Then
            Remove text from the current object
            Move cursor to first position of current
                object
        Else
            Delete the current object
            Move cursor to first position of the previous
                sibling
    Endif
Endmethod
```

Figure 20:
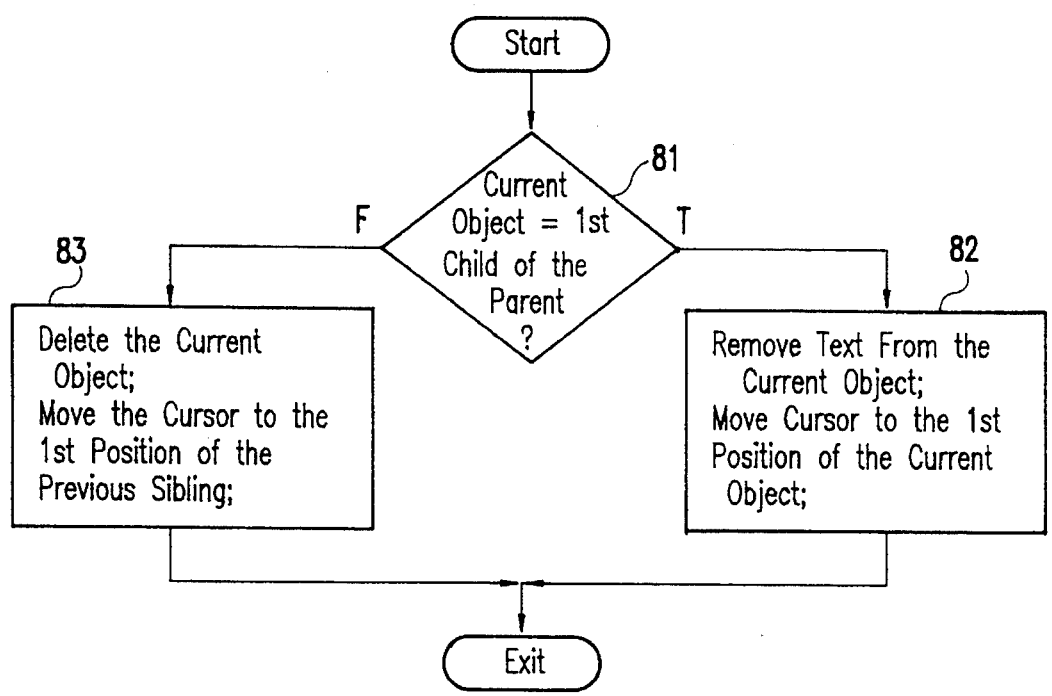
FIG. 20 is a flow diagram showing the logic of the Control/Left Tab control function.

The process is shown in FIG. 20 and begins by determining in decision block 81 whether the current object is a menu bar item. If so, the text is removed from the current object and the cursor is moved to the first position of the current object in function block 82; otherwise, the current object is deleted and the cursor is moved to the first position of the previous sibling in function block 83. In either case, the process then exits.

The Right Tab is used to navigate the cursor to the object on the right of the current object. The following method handles a Right Tab event:

```
Method Right-Tab
    If (current object is menu bar item)
        Then
            If (next sibling exists)
                Then
                    Move cursor to first position of next
                        sibling
            Endif
        Else
            Move cursor to first position of first child
    Endif
Endmethod
```

Figure 21:
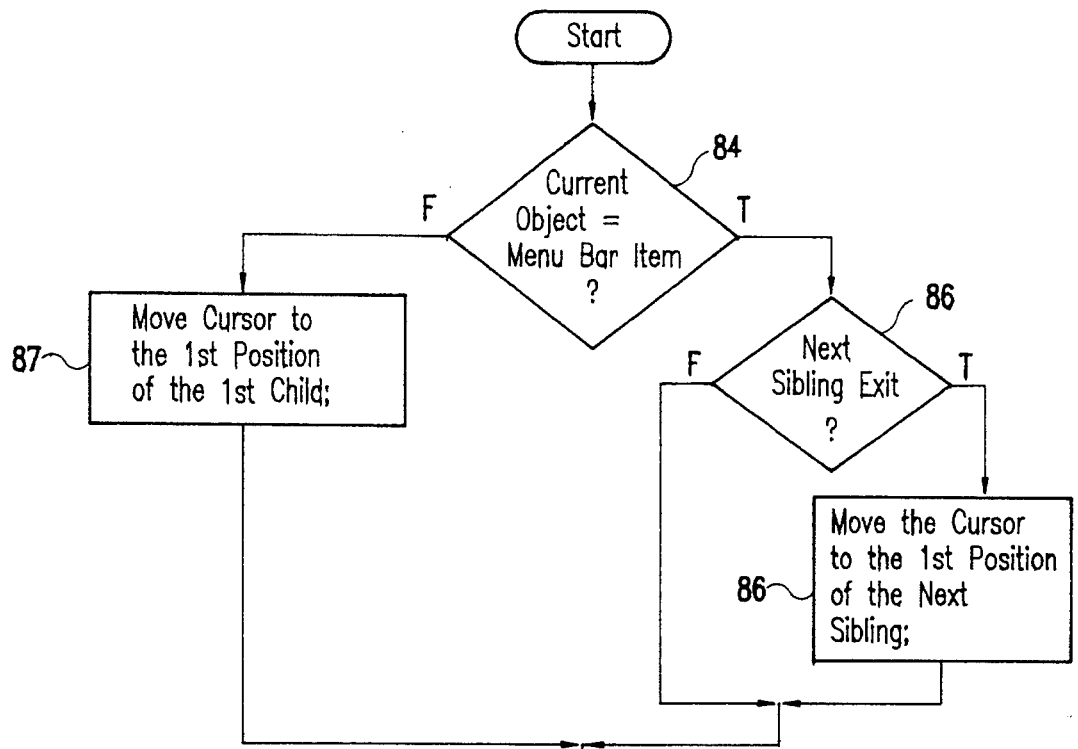
FIG. 21 is a flow diagram showing the logic of the Right Tab control function.

The process is shown in FIG. 21 and begins by determining if the current object is a menu bar item in decision block 84. If so, a second test is made in decision block 85 to determine if the a next sibling exists. If so, the cursor is moved to the fist position of the next sibling in function block 86 before the method exits; otherwise, the method exists directly with no action taken. If the current object is not a menu bar item as determined in decision block 84, then the cursor is moved to the first position of the first child in function block 87 before the method exits.

The Left Tab is used to navigate the cursor to the object on the left of the current object. The following method handles a Left Tab event:

```
Method Left-Tab
    If (current object is menu bar item)
        Then
            If (previous sibling exists)
                Then
                    Move cursor to first position of previous
                        sibling
                Else
                    Move cursor to first position of parent
            Endif
    Endif
Endmethod
```

Figure 22:
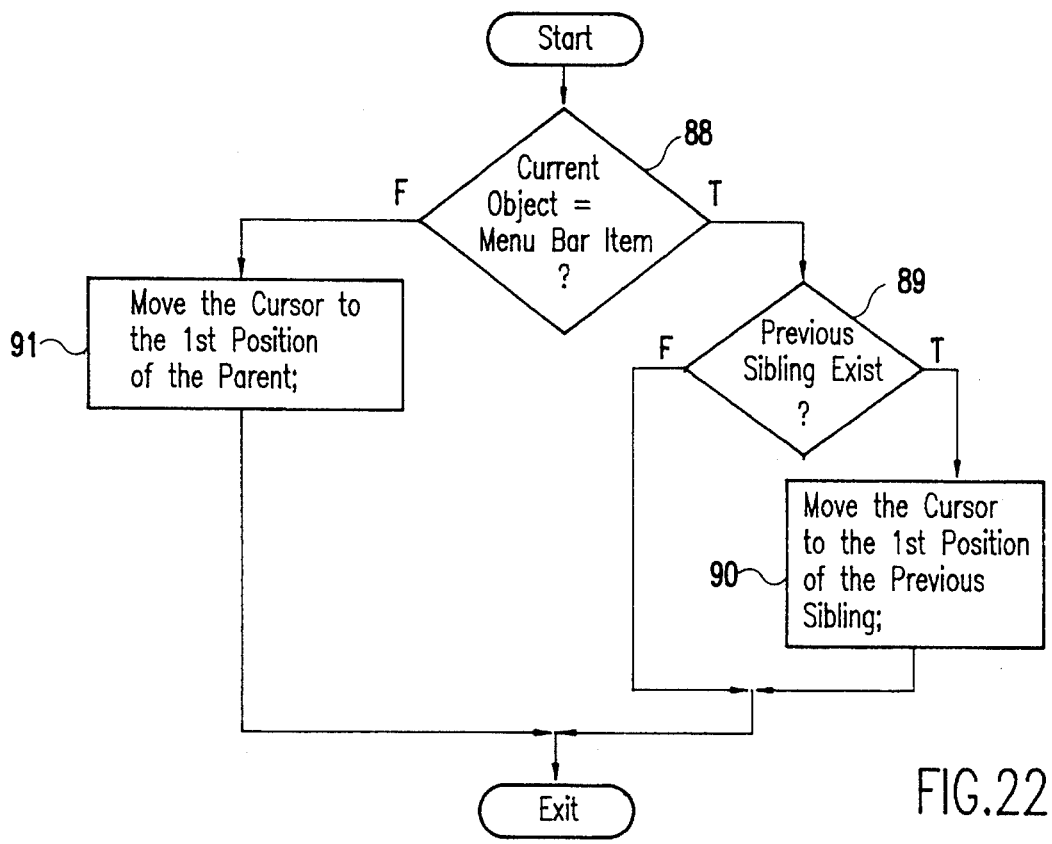
FIG. 22 is a flow diagram showing the logic of the Left Tab control function.

The process is shown in FIG. 22 and begins by determining if the current object is a menu bar item in decision block 88. If so, a second test is made in decision block 89 to determine if the a previous sibling exists. If so, the cursor is moved to the fist position of the previous sibling in function block 90 before the method exits; otherwise, the method exists directly with no action taken. If the current object is not a menu bar item as determined in decision block 88, then the cursor is moved to the first position of the parent in function block 91 before the method exits.

The Up Arrow is used to navigate the cursor to the object on the top of the current object. The following method handles an Up Arrow event:

```
Method Up-Arrow
    If (current object is not menu bar item)
        Then
            If (current object is first child of parent)
                Then
                    Move cursor to first position of parent
                Else
                    Move cursor to first position of previous
                        sibling
            Endif
    Endif
Endmethod
```

Figure 23:
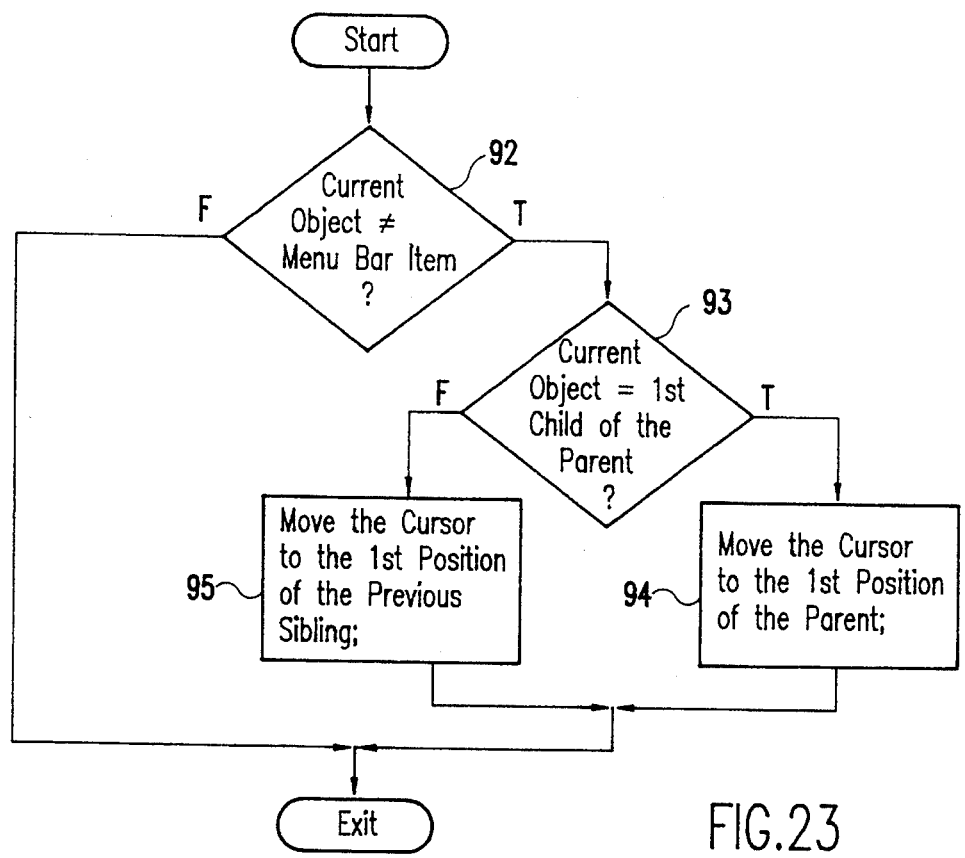
FIG. 23 is a flow diagram showing the logic of the Up Arrow control function.

The process is shown in FIG. 23 and begins by determining if the current object is a menu bar item in decision block 92. If so, a second test is made in decision block 93 to determine if the current object is a first child of the parent. If so, the cursor is moved to the fist position of the parent in function block 94 before the method exits; otherwise, the cursor is moved to the first position of the previous sibling in function block 95 before the method exits. If the current object is not a menu bar item as determined in decision block 92, then the method exists directly with no action taken.

The Down Arrow is used to navigate the cursor to the object on the bottom of the current object. The following method handles a Down Arrow event:

```
Method Down-Arrow
    If (current object is menu bar item)
        Then
            If (current object has child)
                Then
                    Move cursor to first position of first
                        child
            Endif
        Else
            If (current object has next sibling)
                Then
                    Move cursor to first position of next
                        sibling
            Endif
    Endif
Endmethod
```

Figure 24:
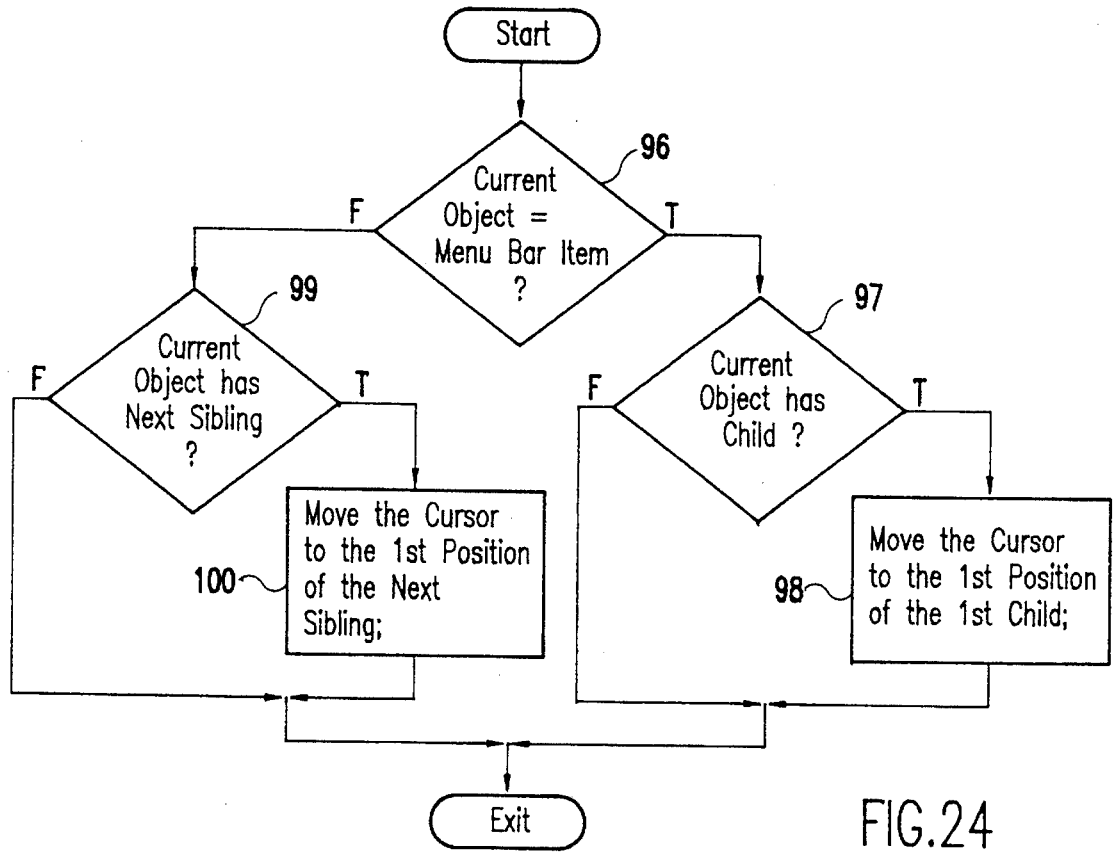
FIG. 24 is a flow diagram showing the logic of the Down Arrow control function.

The process is shown in FIG. 24 and begins by determining if the current object is a menu bar item in decision block 96. If so, a second test is made in decision block 97 to determine if the current object has a child. If so, the cursor is moved to the first position of the first child in function block 98 before the method exits; otherwise, the method exists directly with no action taken. If the current object is not a menu bar item as determined in decision block 96, another test is made in decision block 99 to determine if the current object has a next sibling. If so, the cursor is moved to the first position of the next sibling in function block 100 before the method exits; otherwise, the method exists directly with no action taken.

Figure 25A:
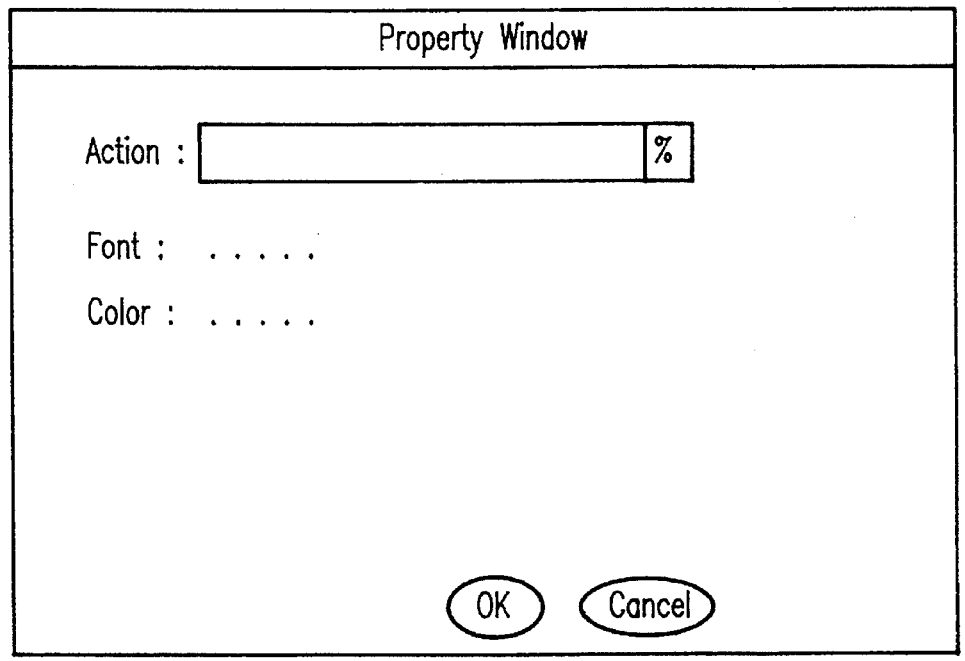
FIG. 25A, 25B and 25C are facsimiles of control panels prompting user input in the practice of the invention.
Figure 25B:
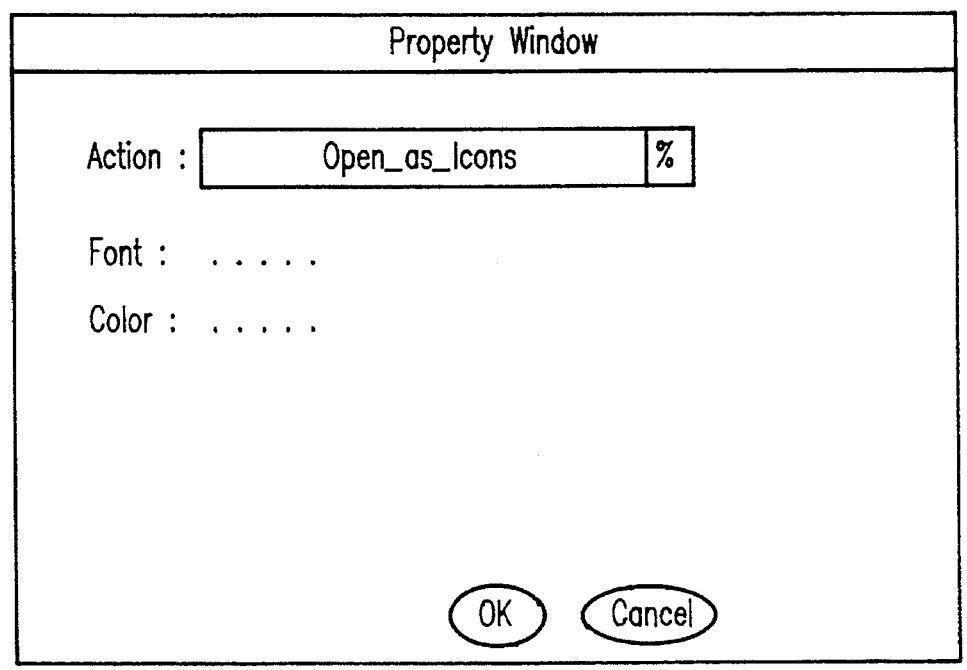
Figure 25C:
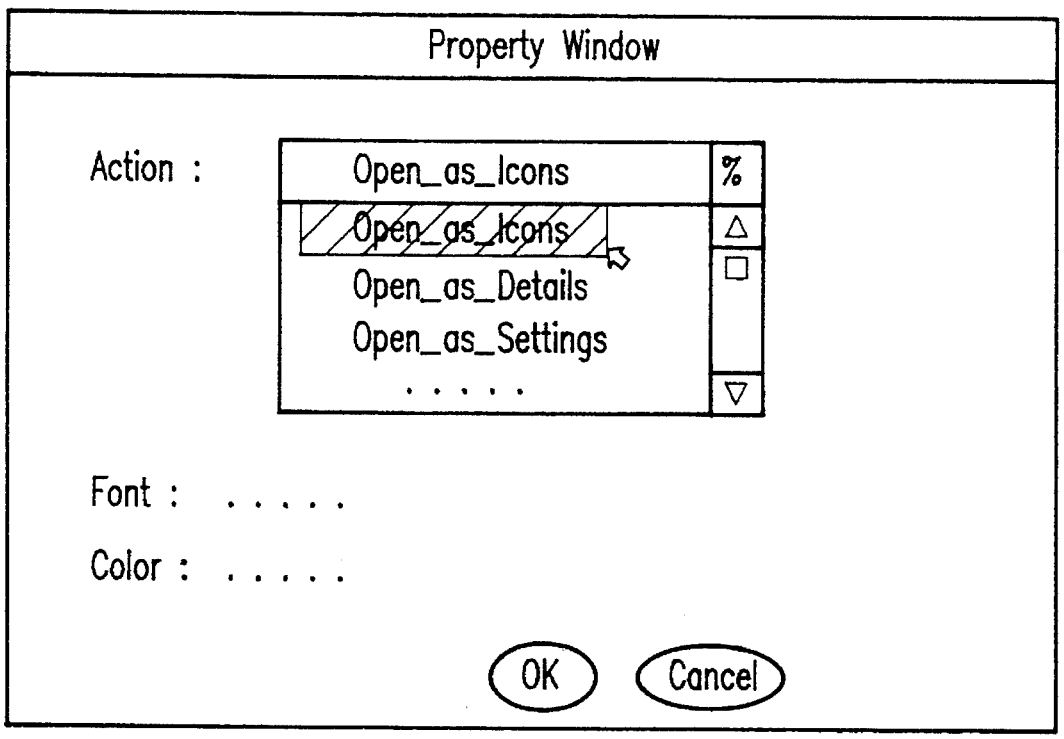

After the menu bar has been defined, the user still needs to define each action for the pull down menu item or cascade menu item. Only the lowest level child needs to have an action attached. For any higher level object, the action is to display the next level child, either in a pull down menu or a cascade menu. The application builder has two different modes, the edit mode and the run mode. The user may define both the content and the action for the menu bar during the edit mode. During the run mode, the associated action will be performed. After the menu bar content has been defined, the user may double click the lowest level object, the property window will then be presented. A blank entry field label "Action" is presented, as shown in FIG. 25A. The user may then enter the proper method name defined for the application window object in the entry field. In the example shown in FIG. 25B, the user has entered the method name "Open_as_Icons" in the action entry field. The user may also select the proper method name from the list box which contains all the methods defined for the application window. In the example shown in FIG. 25C, the user has selected "Open_as_Icons" as the entry field selection. When the user selects the method name from the list box, the method name will be presented in the entry field, again as shown in FIG. 25b. After the user selects the OK button for the property window in the screen shown in FIG. 25B, the action is then defined for that pull down menu item or cascade menu item.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A computer implemented method for designing and defining a menu bar for a computer application program, comprising the steps of:

displaying an application builder icon;

displaying a tool box in response to the selecting of the application builder icon, said tool box having a menu bar icon;

displaying a blank menu bar on the computer screen with positions for menu items in response to the selecting of the menu bar icon;

in an edit mode, prompting a user to directly input text for each menu item at corresponding ones of said positions to thereby define menu items in said menu bar;

responding to a user selection of a defined menu item in the menu bar by opening a pull down menu on the computer screen below the selected menu item;

prompting the user to directly input at least one menu item in the opened pull down menu to thereby define a menu item in the pull down menu;

responding to a user selection of a defined menu item in an opened pull down menu by opening a cascade menu on the computer screen adjacent the selected menu item;

prompting the user to directly input at least one menu item in the opened cascaded menu to thereby define a menu item in the cascade menu;

in a run mode, displaying a property window; and for each lowest level menu item in a pull down menu or a cascade menu, prompting the user to directly input a name of a defined action of the menu item.

2. The method recited in claim 1, wherein the method is implemented in a graphic user interface environment, said method further comprising the steps of:

displaying a toolbox window on the computer screen, said toolbox window including at least a menu bar tool object; and simultaneously displaying an application window on the computer screen;

said step of providing a blank menu bar being performed in response to a user dragging and dropping said menu bar tool object in said application window.

3. The method recited in claim 2, wherein said method for designing and defining a menu bar is part of an application builder method and wherein the steps of displaying a toolbox window and an application window on the computer screen is in response to a user selecting an application builder icon on the computer screen to thereby invoke the application builder method.

4. The method recited in claim 1 further comprising the step of navigating a cursor on the computer screen to facilitate direct editing of menu items.

5. The method recited in claim 4 wherein the step of navigating the cursor comprises the steps of:

navigating the cursor within a menu item in response to left arrow and right arrow keyboard commands;

navigating the cursor to a menu item to right of a current menu item, if any, but if the current menu item is not a top-level menu item and a parent, navigating the cursor to a first child in response to a right tab keyboard command;

navigating the cursor to a menu item on left of a current menu item if the current menu item is a top-level menu item, otherwise navigating the cursor to parent of the current menu item in response to a left tab keyboard command;

navigating the cursor to a menu item above a current menu item, or if the current menu item is a first menu item, navigating the cursor to a parent in response to an up arrow keyboard command; and navigating the cursor to a menu item below a current menu item, if any, otherwise, navigating the cursor to a child, if any, in response to a down arrow keyboard command.

6. The method recited in claim 4 further comprising the step of direct editing text of menu items at a location of the cursor.

7. The method recited in claim 6 wherein the step of direct editing of text comprises the steps of:

inserting a character at the location of the cursor in response to an alphanumeric keyboard input;

deleting a character at the location of the cursor in response to a back space keyboard input;

creating a new menu item below a current menu item and moving the cursor to the new menu item in response to an Enter keyboard input;

creating a new top-level menu item immediately to right of a current menu item if the current menu item is a top level menu item, otherwise, creating a new first child and, in either case, moving the cursor to the new menu item or first child in response to a control-right tab keyboard input; and deleting a current menu item at the location of the cursor in response to a control-left tab keyboard input.

8. A computer system for user interactive design and definition of a menu bar for an application program comprising:

a central processing unit executing an application builder program stored in a memory device accessed by said central processing unit;

a computer display on which said central processing unit displays screens of the application builder program in response to user inputs; and a user interface including a cursor pointing device for controlling a position of the cursor on a display screen and a keyboard for entering navigation and editing commands, said central processing unit controlling said computer display to display an application builder icon, display a tool box in response to the selecting of the application builder icon, said tool box having a menu bar icon, displaying a blank menu bar on the computer screen with positions for menu items in response to the selecting of the menu bar icon, in an edit mode, prompting the user to directly input text for each menu item at corresponding ones of said positions to thereby define menu items in said menu bar, responding to a user selection of a defined menu item in the menu bar by opening a pull down menu on the computer screen below the selected menu item, prompting the user to directly input at least one menu item in the opened pull down menu to thereby define a menu item in the pull down menu, responding to a user selection of a defined menu item in an opened pull down menu by opening a cascade menu on the computer screen adjacent the selected menu item, prompting the user to directly input at least one menu item in the opened cascade menu to thereby define a menu item in the cascade menu, and in a run mode, displaying a property window, and for each lowest level menu item in a pull down menu or cascade menu, prompting the user to directly input a name of a defined action of the menu item.

9. The computer system recited in claim 8 wherein the application builder program is implemented in a graphic user interface environment, said central processing unit further displaying a toolbox window on the computer screen, said toolbox window including at least a menu bar tool object, and simultaneously displaying an application window on the computer screen, said central processing unit providing a blank menu bar in response to a user dragging and dropping said menu bar tool object in said application window.

10. The computer system recited in claim 9 wherein said central processing unit displays a toolbox window and an application window on the computer screen in response to a user selecting an application builder icon on the computer screen to thereby invoke the application builder program.

* * * * *